United States Patent [19]

Matsuda et al.

[11] Patent Number: 4,655,311
[45] Date of Patent: Apr. 7, 1987

[54] REAR WHEEL STEERING DEVICE FOR MOTORCYCLES

[75] Inventors: Atsushi Matsuda, Iwata; Toshiyuki Sato, Fukuroi, both of Japan

[73] Assignee: Yamaha Hatsudoki Kabushiki Kaisha, Iwata, Japan

[21] Appl. No.: 827,803

[22] Filed: Feb. 7, 1986

[30] Foreign Application Priority Data

Feb. 8, 1985 [JP] Japan ................................. 60-21803
Feb. 12, 1985 [JP] Japan ................................. 60-23581

[51] Int. Cl.⁴ ............................................. B62K 21/00
[52] U.S. Cl. .................................................. 180/219
[58] Field of Search ............... 180/219, 220, 222, 223, 180/224, 227, 140; 280/267, 269, 266, 91

[56] References Cited

U.S. PATENT DOCUMENTS

3,053,547 9/1962 Osborne ................................. 280/91
4,157,739 6/1979 Frye ..................................... 280/266
4,582,334 4/1986 Tashiro et al. ......................... 280/91

Primary Examiner—John A. Pekar
Attorney, Agent, or Firm—Ernest A. Buetler

[57] ABSTRACT

Two embodiments of steering arrangements for motorcycles wherein the rear wheel is supported for steering movement and is mechanically coupled by a positive linkage system to the mechanism for steering the front wheels so that both wheels will be steered in unison. In one embodiment of the invention, the positive linkage system includes irreversible gearing so that forces applied to the rear wheel will not effect its steering or steering of the front wheel.

15 Claims, 8 Drawing Figures

REAR WHEEL STEERING DEVICE FOR MOTORCYCLES

BACKGROUND OF THE INVENTION

This invention relates to a rear wheel steering device for motorcycles and more particularly to an improved and simplified arrangement for steering both the front and rear wheels of a vehicle such as a motorcycle.

Most vehicles intended for use on public roads for transportation are designed so that they include one or more steered front wheels and one or more non-steered rear wheels. Motorcycles are typical examples of this type of vehicle wherein there is a steered front wheel and a non-steered driven rear wheel. Although such an arrangement offers the advantage of simplicity, it does not necessarily offer the best handling when rounding curves or changing directions. That is, when turning, the front wheel is steered into the direction of the turn but the rear wheel is still pointed in a direction tending to go straight ahead. This can cause difficulties in handling.

It is, therefore, a principal object of this invention to provide an improved steering arrangement for vheicles wherein both the front and rear wheels are steered.

It is a further object of this invention to provide a steering mechanism for vehicles that will improve their handling.

If it is desired to steer the rear wheel as well as the front wheel of a vehicle, it is important that the steering relationship between the front and rear wheels be accurately and positively controlled. It is, therefore, a still further object of this invention to provide a device for positively steering the rear wheel of a vehicle in response to steering movement of its front wheel.

It is a further object of this invention to provide an improved rear wheel steering mechansim for a motorcycle wherein the steering is controlled by the positioning of the front wheel.

If the front and rear wheels are connected for common steering, the connection between the wheels and steering mechanisms should be such that it will insure that the amount of steering of the rear wheel in relation to the steering of the front wheel does not vary for a given steering input to the front wheel. Therefore, it is a further object of this invention to provide an improved and positive mechanism for interconnecting the front and rear wheel steering mechanisms.

When the front and rear wheels are interconnected for simultaneous steering, it is desirable to insure that loads applied to the rear wheel which tend to cause it to move in a steered direction do not result in steering movement of the front wheel. This is particularly important since, in most instances, the amount of steering of the rear wheel is very small in relation to the amount of steering of the front wheel.

It is therefore, a still further object of this invention to provide an improved steering mechanism for the front and rear wheels of a vehicle wherein the rear wheel is not permitted to steer the front wheel.

SUMMARY OF THE INVENTION

One feature of this invention is adapted to be embodied in a vehicle having at least one dirigible front wheel steered by an operator and at least one rear wheel. Means are provided for supporting the rear wheel for steering movement and positive linkage means mechanically couple the front wheel to the rear wheel for simultaneous steering movement.

Another feature of this invention is also adapted to be embodied in a vehicle having at least one dirigible front wheel steered by an operator and at least one rear wheel that is supported for steering movement. Means couple the front and rear wheel steering mechanisms for simultaneous steering mvoement and this means also insures that forces applied to the rear wheel cannot effect its steering or the steering of the front wheel.

DETAILED DESCRIPTION OF THE PREFERRED EMBODIMENTS

Figure 1:
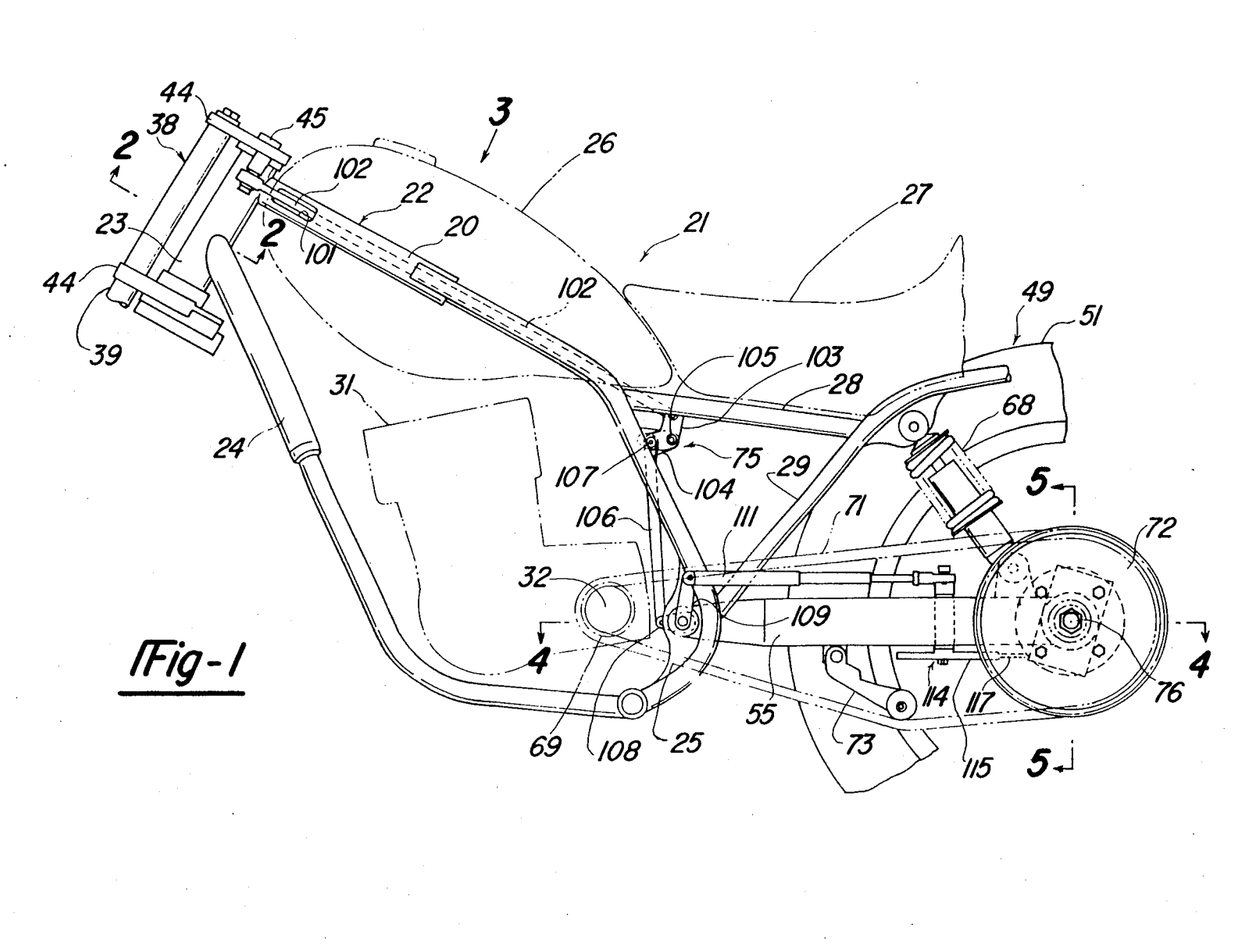
FIG. 1 is a side elevational view of a motorcycle constructed in accordance with a first embodiment of the invention with portions shown in phantom and other portions deleted.

Referring first to the embodiment of FIGS. 1 through 5 and initially primarily to FIG. 1, a motorcycle constructed in accordance with this embodiment is identified generally by the reference numeral 21. The motorcycle 21 includes a frame assembly, indicated generally by the reference numeral 22, and which may be of any known type. In the illustrated embodiment, the frame assembly 22 is depicted as being made up of a welded tubular construction including a head pipe 23, a main tube 20, a down tube 24 and a bracket 25 that is affixed to the down tube and a rearwardly and downwardly projecting portion of the main tube 20. A fuel tank 26 is supported on the main tube 20 and is positioned forwardly of a seat 27 that is supported on a seat rail 28 and a seat pillar rail 29 of the frame assembly 22. Since the frame assembly per se forms no part of the invention, a further description of it is believed to be unnecessary.

An internal combustion engine, indicated generally by the reference numberal 30, is supported within the frame assembly 22 in a known manner. The engine 31 also includes a combined crankcase, transmission assembly that drives an output shaft 32 at any of a plurality of selected speed ratios.

A front wheel (not shown) is supported from the forward portion of the frame assembly 22 and specifically the head pipe 23 for steering and suspension movement by means of a front wheel steering assembly, indicated generally by the reference numeral 38. The front wheel steering assembly 38 includes a front fork 39 that carries the front wheel for rotation at its lower end.

Upper and lower brackets 44 connect the front fork 38 to a steering shaft 45 that is journaled for rotation about a front steering axis in the head pipe 23. A handlebar assembly (not shown) is connected to the brackets 44 and steering shaft 45 in a known manner so that a rider positioned on the seat 27 may steer the front wheel.

A driven rear wheel assembly, indicated generally by the reference numeral 49, is carried at the rear end of the frame assembly 22 in a manner to be described. The rear wheel 49 includes a tire 51 that is mounted on a rim 52 that is carried by spokes 53 and connected to a hub portion 54 (FIGS. 4 and 5).

It should be noted that the motorcycle 21 as thus far described is generally conventional in configuration and, for that reason, only the general construction has been described in detail.

Figure 4:
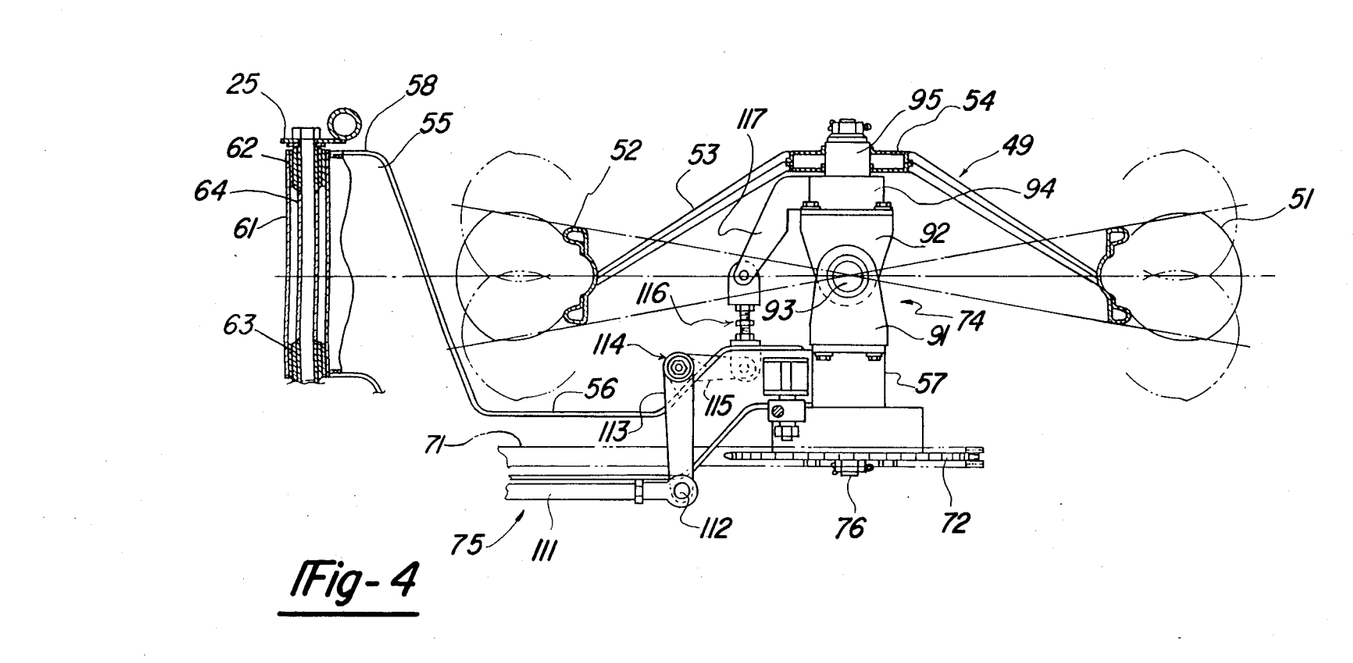
FIG. 4 is a cross-sectional view taken along the line 4—4 of FIG. 1 on an enlarged scale.
Figure 5:
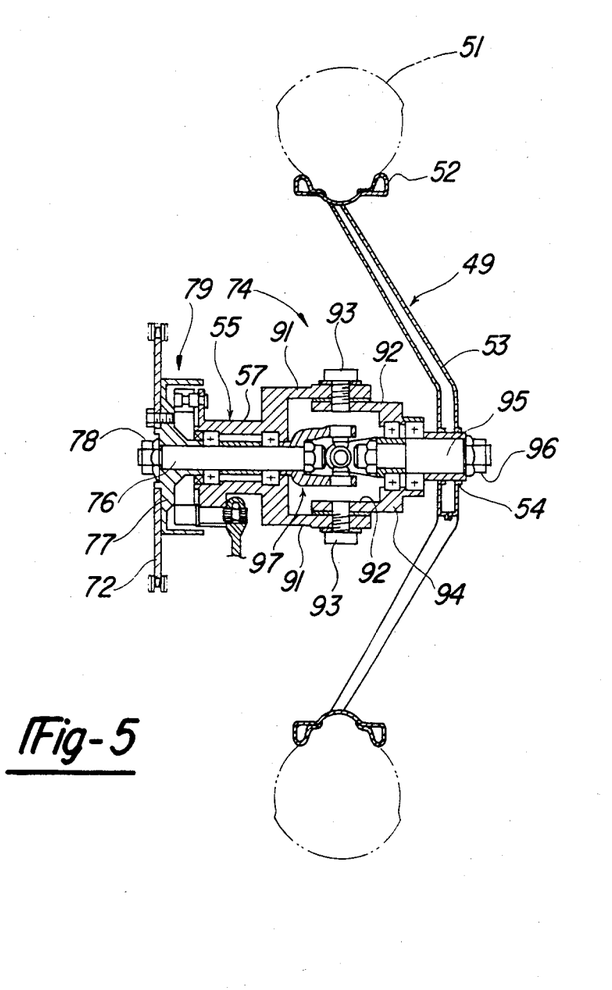
FIG. 5 is an enlarged cross-sectional view taken along the line 5—5 of FIG. 1.

The rear wheel 49 is supported for suspension movement relative to the frame 22 by means that include a trailing arm assembly, indicated generally by the reference numeral 55 and shown in most detail in FIG. 4. Because of differences which will be described, the trailing arm assembly 53 includes one rearwardly extending arm portion 56 that lies on only one side of the rear wheel assembly 49 and which supports the rear wheel assembly by means of a hub carrier 57 that is fixed at its trailing end. Forwardly of the rearwardly extending portion 56, the trailing arm 55 has a main portion 58 that extends substantially across the width of the motorcycle between the brackets 25 and which is formed of a welded up box section. This box section has a tube 61 carried at its forward end, which tube is, in turn, journaled on a pair of axial spaced bushings 62 and 63 that are, in turn, journaled on a shaft 64 that is carried in the brackets 25.

The suspension travel of the rear wheel 49 and trailing arm 55 are controlled by a combined coil spring and shock absorber unit 68 that is loaded between the rear end of the arm portion 56 and the frame 22 at a point contiguous to where the seat pillar 29 joins the seat rail 28.

The rear wheel 49 is driven and to this end a driving sprocket 69 is affixed to the engine transmission output shaft 32. A driving chain 71 encircles the sprocket 69 and a driven sprocket 72 that is affixed for rotation with the rear wheel 49 in a manner which will be described. A chain tensioner 73 is carried by the trailing arm 55 so as to maintain uniform tension on the driving chain 71 during its suspension movement.

In addition to being driven and supported for suspension movement, the rear wheel assembly 49 is also supported for steering movement by means of a steering support, indicated generally by the reference number 74, shown in most detail in FIGS. 4 and 5. The steering support 74 is designed so as to provide a steering axis that passes through the transverse center of the rear wheel assembly 49 and which lies on a plane passing through the center of the motorcycle 21 and containing the front wheel steering axis.

The steering of the rear wheel 49 about its steering axis is controlled by means of a positive linkage steering control mechanism, indicated generally by the reference numberal 75 which connects the front wheel steering mechanism with the rear wheel steering support mechanism 74 in a manner to be described.

Referring now primarily to FIGS. 4 and 5, the rear wheel steering support mechanism 74 will be described in detail. The hub carrier 57 has a pair of spaced apart bearings that rotatably journal a shaft 76. The shaft 76 has a splined connection to a hub member 77 which is, in turn, affixed to the sprocket 72 by means of bolt assemblies. The sprocket 72 and hub member 77 are axially affixed to the shaft 76 by means of a nut 78.

The hub member 77 forms a portion of a drum brake assembly, indicated by the reference numeral 79 and of a known type.

The hub carrier 57 has affixed to it a bifurcated member 91 which, in turn, is pivotally connected to a second bifurcated member 92 by means of a pair of vertically disposed pivot pins 93. The pivot axis between the bifurcated members 91 and 92 defined by the pivot pins 93 lies on the steering axis of the rear wheel assembly 49.

The further bifurcated member 92 is affixed to a second hub carrier 94 which, in turn, journals a shaft 95 by means of a pair of spaced bearings. The shaft 95 is non-rotatably affixed to the rear wheel hub 54 by a splined connection and the hub 54 is held axially onto the shaft 95 by means of a retainer nut 96.

The shafts 76 and 95 are rotatably coupled by means of a universal joint 97 that has its respectively members affixed to the shafts 76 and 95. The universal joint 97 has its pivotal axis lying within the center plane of the motorcycle 21 and on the rear wheel steering axis so that the steering movement of the rear wheel assembly 49 will not interfere with the driving forces transmitted to the rear wheel through the universal joint 97.

Figure 2:
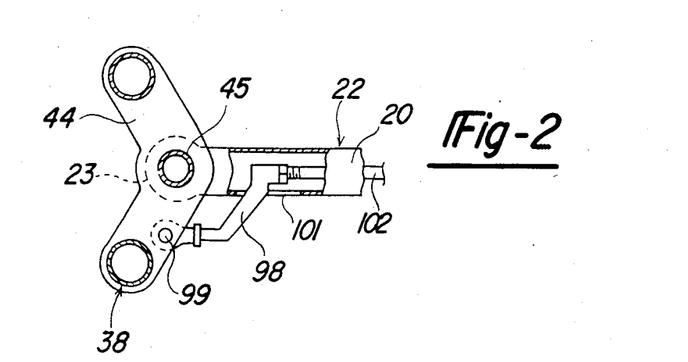
FIG. 2 is an enlarged cross-sectional view taken along the line 2—2 of FIG. 1.
Figure 3:
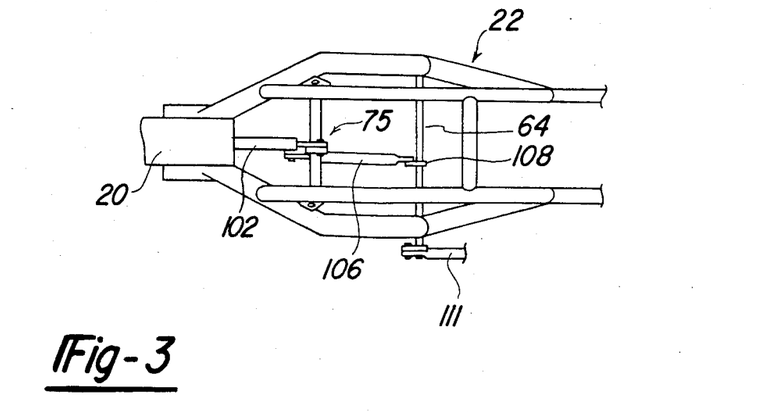
FIG. 3 is a reduced scale, top plan view taken generally in the direction of the arrow 3 in FIG. 1.

The steering control mechanism 75 includes a crank 98 that is connected by means of a pivot pin 99 to the lowermost bracket 44 (FIG. 2). The crank 98 extends through an opening 101 formed in the main frame tube 20 and is there adjustably connected to one end of a push rod 102. The opposite end of the push rod 102 extends out through an opening at the rear end of the main frame tube 20 and is connected to one arm of a bellcrank 103 by means of a pivot pin. The bellcrank 103 is pivotally journaled on the frame by means of a a bracket 104 and pivot pin 105.

The other arm of the bellcrank 103 is pivotally connected to the upper end of a link 106 by means of a pivot pin 107. The lower end of the link 106 is pivotally connected to a lever arm 108 which is affixed to an intermediate portion of the rod or shaft 64. A further lever 109 is connected to an exposed outer end of the shaft 64. This lever 109 is connected to one end of a link 111 that extends parallel to the trailing arm 55. The opposite end of the link 111 is connected by means of a pivot pin 112 to a lever arm 113 which is, in turn, fixed to a vertically extending shaft 114 that is journaled on the trailing arm assembly 55. A further lever arm 115 is affixed to the lower end of the shaft 114. The lever arm 115 is connected by means of a turnbuckle connection 116 to a steering control arm 117 that is affixed to the hub carrier 94.

The steering mechanism for the rear wheel 49 operates as follows. As the front wheel is steered by rotating the shaft 45 and brackets 44, the pin 99 will exert a pushing or pulling force on the crank 98 for axially moving the rod 102. This causes pivotal movement of the bell crank 103 and exerts a force through the link 106 to rotate the shaft 64. This causes the lever arm 109 to be rotated and exerts a force on the link 111 to rotate the lever arm 113 and shaft 114 to activate the turnbuckle 106 and move the steering arm 117 about the axis defined by the pins 93. Hence, the rear wheel 49 will be steered along with the front wheel. The steering ratio will be determined by the mechanical advantages afforded by the various bellcranks and links as well as the amount of offset of the pin 99 from the axis of rotation of the shaft 45.

Because the shaft 64 forms both a portion of the linkage system for steering the rear wheel and also the pivotal support for the trailing arm 55, the suspension travel will have no effect on the linkage system. That is, suspension movement of the rear wheel will in no way affect the steering mechanism nor cause steering of the rear or front wheels.

Figure 6:
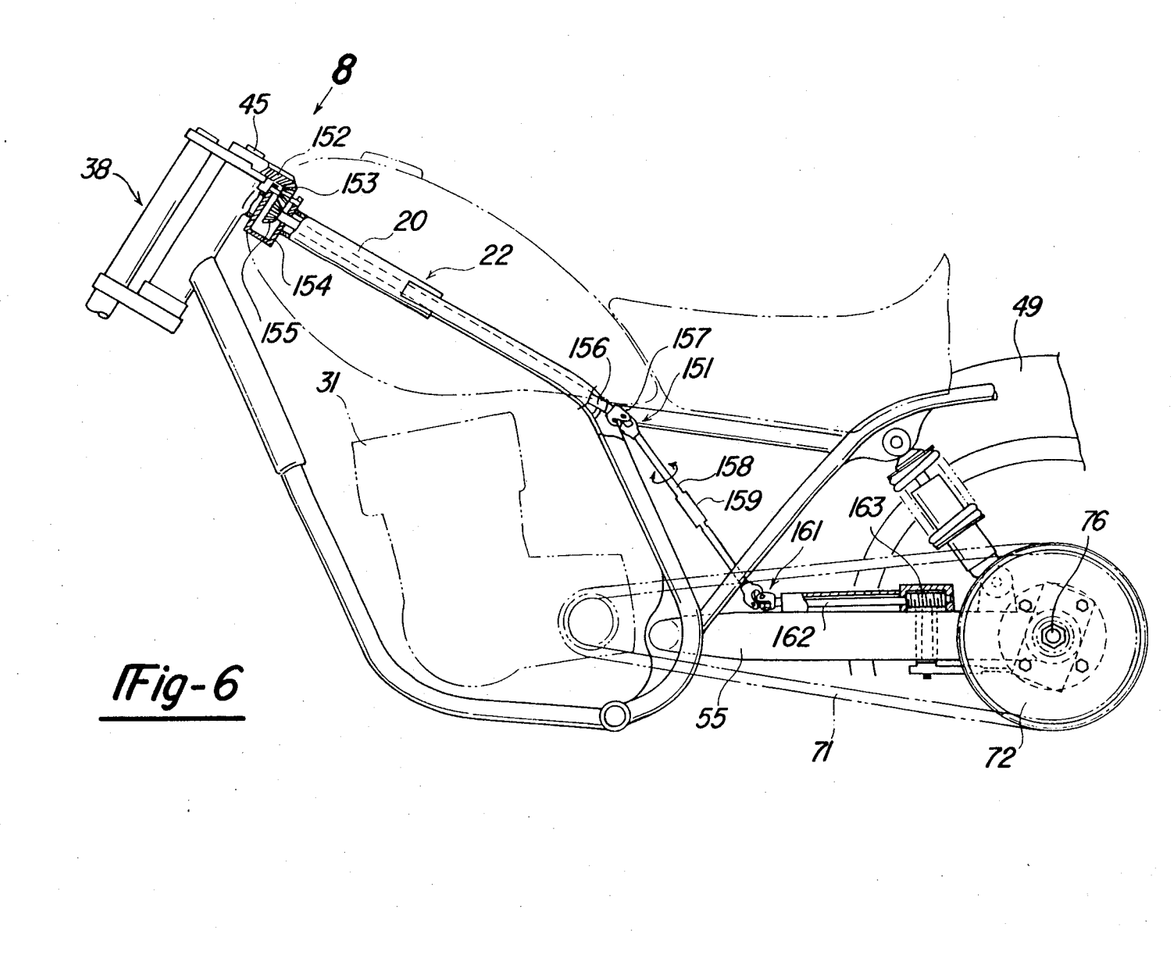
FIG. 6 is a side elevational view, in part similar to FIG. 1, with portions shown in phantom and other portions deleted of a motorcycle constructed in accordance with a second embodiment of the invention.
Figure 7:
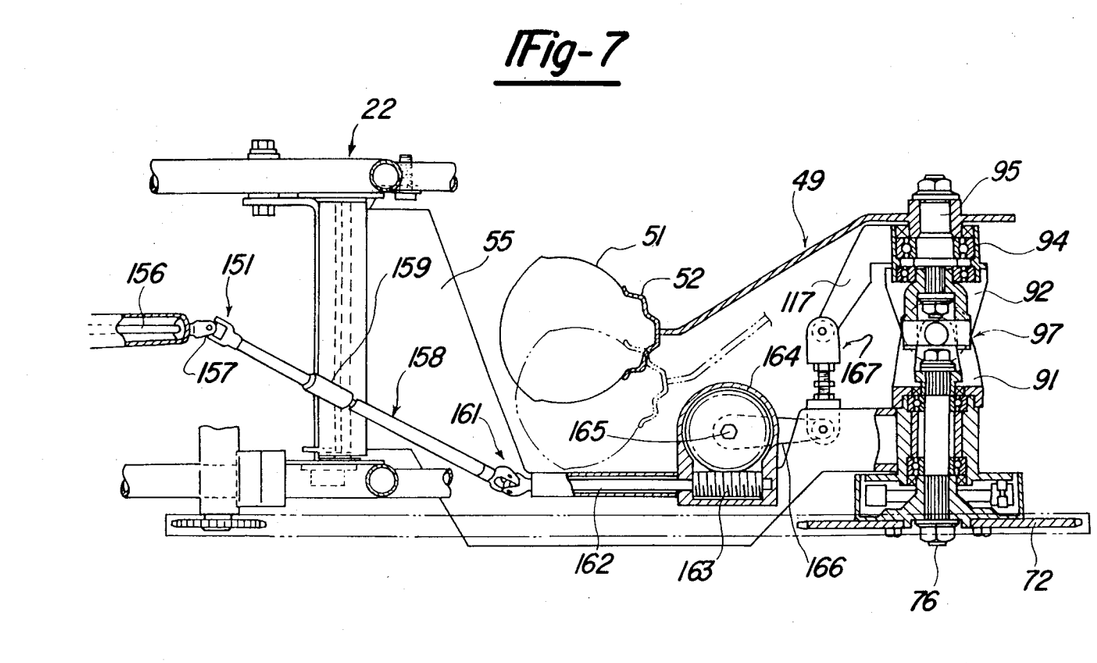
FIG. 7 is an enlarged top plan view showing the rear suspension and drive mechanism of the embodiment of FIG. 6, with portions broken away and shown in section.
Figure 8:
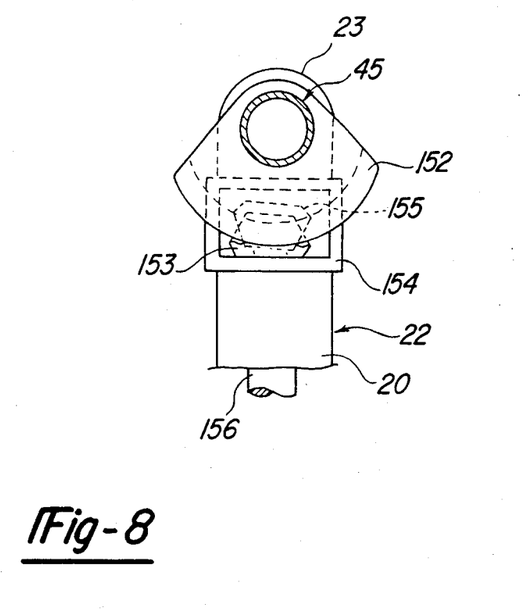
FIG. 8 is a top plan view taken in the direction of the arrow 8 in FIG. 6.

In the embodiment of FIGS. 1 through 5, although the suspension movement of the rear wheel 49 will not cause steering of the front or rear wheels, side forces encountered on the rear wheel 49 could cause it to steer and this steering movment would be transmitted back through the linkage system 75 to effect steering of the front wheel or to put forces on the rider's hands. FIG. 6 through 8 show an embodiment of the invention wherein forces encountered against the rear wheel will not cause steering of either the rear or front wheels. Inasmuch as this embodiment differs from the previously described embodiment only in the interconnection between the front and rear wheel steering, only this portion of the motorcycle will be described in detail and the remaining components which are the same as the preceding embodiment have been identified by the same reference numberals and will be described again only insofar as is necessary to understand the construction and operation of this embodiment.

In this embodiment, the steering control mechanism is identified generally by the reference number 151 and includes a bevel gear 152 that is affixed in a suitable manner for rotation with the steering shaft 45. The bevel gear 152 (which may be only a segment of a complete gear) is in mesh with a bevel gear 153 that is journaled in a suitable manner on the frame and specifically the main tube 20 within a gear casing 154. The gear 153 is, in turn, in mesh with a gear 155 that is affixed to one end of an elongated shaft 156 that extends through the main frame tube 20. The rear end of the shaft 156 is connected by means of a universal joint 157 to a second shaft 158. The shaft 158 includes a splined joint 159 so that its length may change during suspension travel.

A universal joint 161 interconnects the lower end of the shaft 158 with a further shaft 162 that is journaled on the trailing arm 55. The rear end of the shaft 162 carries a worm gear 163 which meshes with a worm wheel 164. The worm wheel 164 is affixed to a shaft 165 that is journaled for rotation about a vertical axis and which carries a lever arm 166 at its lower end. The lever arm 166 is connected to the steering arm 117 by means including a turnbuckle 167.

In this embodiment, rotation of the steering shaft 45 wil cause rotation of the shaft 156 through the gear train comprises of the gears 152, 153 and 155. The universal joint 151 will transmit this rotation to rotation of the shaft 159 and the joint 161 transmits this rotation inot rotation of the shaft 162. This rotation is transmitted through the gears 163 and 164 to the shaft 165 to actuate the lever arm 166 and steer the rear wheel. Because of the worm gear and worm wheel in this connection, forces applied to the rear wheel will not cause it to be steered nor will they effect any steering of the front wheel.

In view of the foregoing, it is believed to be readily apparent to those skilled in the art that a relatively simple and yet highly effective mechanism has been disclosed for permitting steering of the rear wheel mechanically in response to steering of the front wheel. This can be done to improve handling. Although embodiments of the invention have been illustrated and described, various changes and modifications may be made without departing from the spirit and scope of the invention, as defined by the appended claims.

We claim:

1. A vehicle having at least on dirigible front wheel steered by an operator by means of operator control means and at least one rear wheel, the improvement comprising means for supporting said rear wheel for steering movement and positive linkage means for mechanically coupling said front wheel steering mechanism to said rear wheel steering mechanism for simultaneous steering movement comprising to plurality of links pivotally connected to each other, said rear wheel being supported for suspension movement by a trailing arm pivotal about an axis coincident with the pivot axis of one of the link pivotal connections.

2. A vehicle as set forth in claim 1 wherein at least one of the steered wheels is driven.

3. A vehicle as set forth in claim 2 wherein the rear wheel is the driven wheel.

4. A vehicle as set forth in claim 1 wherien the linkage means includes a pair of shafts rotatable about intersection axes and joined by a universal joint.

5. A vehicle as set forth in claim 4 wherein one of the rotatable shafts is gear driven from the operator control means.

6. A vehicle as set forth in claim 1 wherein the vehicle comprises a motorcycle having only a single steered front wheel and a single steered rear wheel.

7. A vehicle as set forth in claim 6 further including operator control means for steering the front wheel.

8. A vehicle as set forth in claim 7 wherein the means for mechanically coupling the front and rear wheel couples the rear wheel steering mechanism to the front wheel steering mechanism.

9. A vehicle as set forth in claim 8 wherein the linkage means includes a pair of shafts rotatable about intersecting axes and joined by a universal joint.

10. A vehicle as set forth in claim 9 wherein one of the rotatable shafts is gear driven from the operator control means.

11. A motorcycle having one dirigible front wheel steered by an operator and one rear wheel, the improvement comprising means for supporting said rear wheel for steering movement and means for mechanically coupling said front and rear wheels for simultaneous steering movement and for precluding steering of the front wheel by forces exerted on the rear wheel tending to steer it.

12. A motorcycle as set forth in claim 11 wherein the means for preventing steering of the front wheel upon forces exerted to the rear wheel comprises an irreversible connection between the front and rear wheels steering.

13. A motorcycle as set forth in claim 12 wherein the irreversible connection comprises a worm and worm wheel.

14. A motorcycle as set forth in claim 13 wherein the means for mechanically coupling the front and rear wheels comprises positive linkage means.

15. A motorcycle as set forth in claim 14 wherein the linkage means includes a pair of shafts rotatable about intersecting axes and joined by a universal joint.

* * * * *

UNITED STATES PATENT AND TRADEMARK OFFICE
CERTIFICATE OF CORRECTION

PATENT NO. : 4,655,311

DATED : April 7, 1987

INVENTOR(S) : Atsushi Matsuda et al

It is certified that error appears in the above-identified patent and that said Letters Patent is hereby corrected as shown below:

Column 6, line 8, Claim 1, "on" should be --one--.

Column 6, line 15, Claim 1, "to" should be --a--.

Column 6, line 24, Claim 4, "wherien" should be --wherein--.

Column 6, lines 25-26, Claim 4,
"intersection" should be --intersecting--.

Signed and Sealed this

Fifteenth Day of September, 1987

Attest:

DONALD J. QUIGG

Attesting Officer

Commissioner of Patents and Trademarks